(12) United States Patent
Stanton et al.

(10) Patent No.: US 11,249,804 B2
(45) Date of Patent: Feb. 15, 2022

(54) AFFINITY BASED OPTIMIZATION OF VIRTUAL PERSISTENT MEMORY VOLUMES

(71) Applicant: International Business Machines Corporation, Armonk, NY (US)

(72) Inventors: David Anthony Larson Stanton, Rochester, MN (US); Stuart Zachary Jacobs, Lakeville, MN (US); Troy David Armstrong, Rochester, MN (US); Peter J. Heyrman, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 16/594,873

(22) Filed: Oct. 7, 2019

(65) Prior Publication Data
US 2021/0103474 A1  Apr. 8, 2021

(51) Int. Cl.
*G06F 9/50* (2006.01)
*G06F 16/182* (2019.01)
*G06F 9/455* (2018.01)

(52) U.S. Cl.
CPC ........ *G06F 9/5016* (2013.01); *G06F 9/45558* (2013.01); *G06F 9/5077* (2013.01); *G06F 16/182* (2019.01); *G06F 2009/45562* (2013.01); *G06F 2009/45583* (2013.01)

(58) Field of Classification Search
CPC .... G06F 9/5016; G06F 16/182; G06F 9/5077; G06F 9/45558; G06F 2009/45583
See application file for complete search history.

(56) References Cited

U.S. PATENT DOCUMENTS

| | | | |
|---|---|---|---|
| 8,688,923 B2 | 4/2014 | Jacobs et al. |
| 8,972,991 B2 | 3/2015 | Traut et al. |
| 9,213,609 B2 | 12/2015 | Hansen et al. |
| 9,792,221 B2 | 10/2017 | Richter et al. |
| 10,037,228 B2 | 7/2018 | Barrow-Williams et al. |

(Continued)

FOREIGN PATENT DOCUMENTS

EP  1988473 B1  2/2012

OTHER PUBLICATIONS

Vasily A. Sartakov, NV-Hypervisor: Hypervisor-based Persistence for Virtual Machines; 2014 IEEE (Year: 2014).*

*Primary Examiner* — Dong U Kim
(74) *Attorney, Agent, or Firm* — Garg Law Firm, PLLC; Rakesh Garg; Nathan Rau

(57) ABSTRACT

A computer-implemented method and system for affinity based optimization of persistent memory volumes. Responsive to receiving a request for a parent virtual PMEM device, a total memory capacity is apportioned amongst virtual persistent memory (PMEM) resources and physical memory resources. In accordance with a target affinity characteristic, a set of virtual central processor unit (CPU) sockets are assigned. Each virtual CPU socket is configured based on at least one physical central processor unit (CPU) core in conjunction with a subset of the virtual PMEM and physical memory resources. Child virtual PMEM devices are created for respective ones of the virtual CPU sockets, each of the child virtual PMEM devices being dedicated to the parent virtual PMEM device.

20 Claims, 7 Drawing Sheets

(56) References Cited

U.S. PATENT DOCUMENTS

| | | | | |
|---|---|---|---|---|
| 10,754,792 B2* | 8/2020 | El Hajj | ............... | G06F 12/109 |
| 2004/0139287 A1* | 7/2004 | Foster | ............... | G06F 9/5016 |
| | | | | 711/153 |
| 2004/0148360 A1 | 7/2004 | Mehra et al. | | |
| 2012/0311274 A1* | 12/2012 | Jacobs | ............... | G06F 11/0724 |
| | | | | 711/153 |
| 2017/0300442 A1 | 10/2017 | Xue et al. | | |
| 2019/0095114 A1* | 3/2019 | Prasad | ............... | G06F 3/0649 |

* cited by examiner

AFFINITY BASED OPTIMIZATION OF VIRTUAL PERSISTENT MEMORY VOLUMES

TECHNICAL FIELD

The present invention relates generally to data processing systems, and more particularly, to affinity based optimization of virtual persistent memory volumes.

BACKGROUND

As newer persistent memory (PMEM) technologies become available, software management and virtualization of such devices introduces new challenges. With hardware based PMEM devices, the user typically sees a hardware PMEM device of a given capacity, and then assigns that device to a guest or application. Alternatively, the user may partition the PMEM device into different hardware PMEM volumes that are assigned to different guests or applications. For large multi socket systems where socket level affinity is important, the user may also take affinity into account when assigning input/output (IO)) resources and PMEM devices or volumes to guests and workloads, such that central processing unit (CPU), IO, dynamic random access memory (DRAM), and PMEM are grouped in close proximity.

SUMMARY

The illustrative embodiments provide a method, system, and computer program product. An embodiment includes a computer-implemented method for affinity based optimization of persistent memory volumes. In an embodiment, responsive to receiving a request for a parent virtual PMEM device, a total memory capacity is apportioned amongst virtual persistent memory (PMEM) resources and physical memory resources. In an embodiment, in accordance with a target affinity characteristic, a set of virtual central processor unit (CPU) sockets are assigned. Each virtual CPU socket is configured based on at least one physical central processor unit (CPU) core in conjunction with a subset of the virtual PMEM and physical memory resources. In one embodiment, child virtual PMEM devices are created for respective ones of the set of virtual CPU sockets, each child virtual PMEM device of the set of child virtual PMEM devices being dedicated to the parent virtual PMEM device.

An embodiment includes a computer usable program product. The computer usable program product includes one or more computer-readable storage devices. Program instructions stored on at least one of the one or more storage devices are executable in one or more processors to provide affinity based optimization of persistent memory volumes.

An embodiment includes a computer system. The computer system includes one or more processors, one or more computer-readable memories, and one or more computer-readable storage devices. Program instructions stored on at least one of the one or more storage devices for execution by at least one of the one or more processors via at least one of the one or more memories. The program instructions are executable in the one or more processors to provide affinity based optimization of persistent memory volumes.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
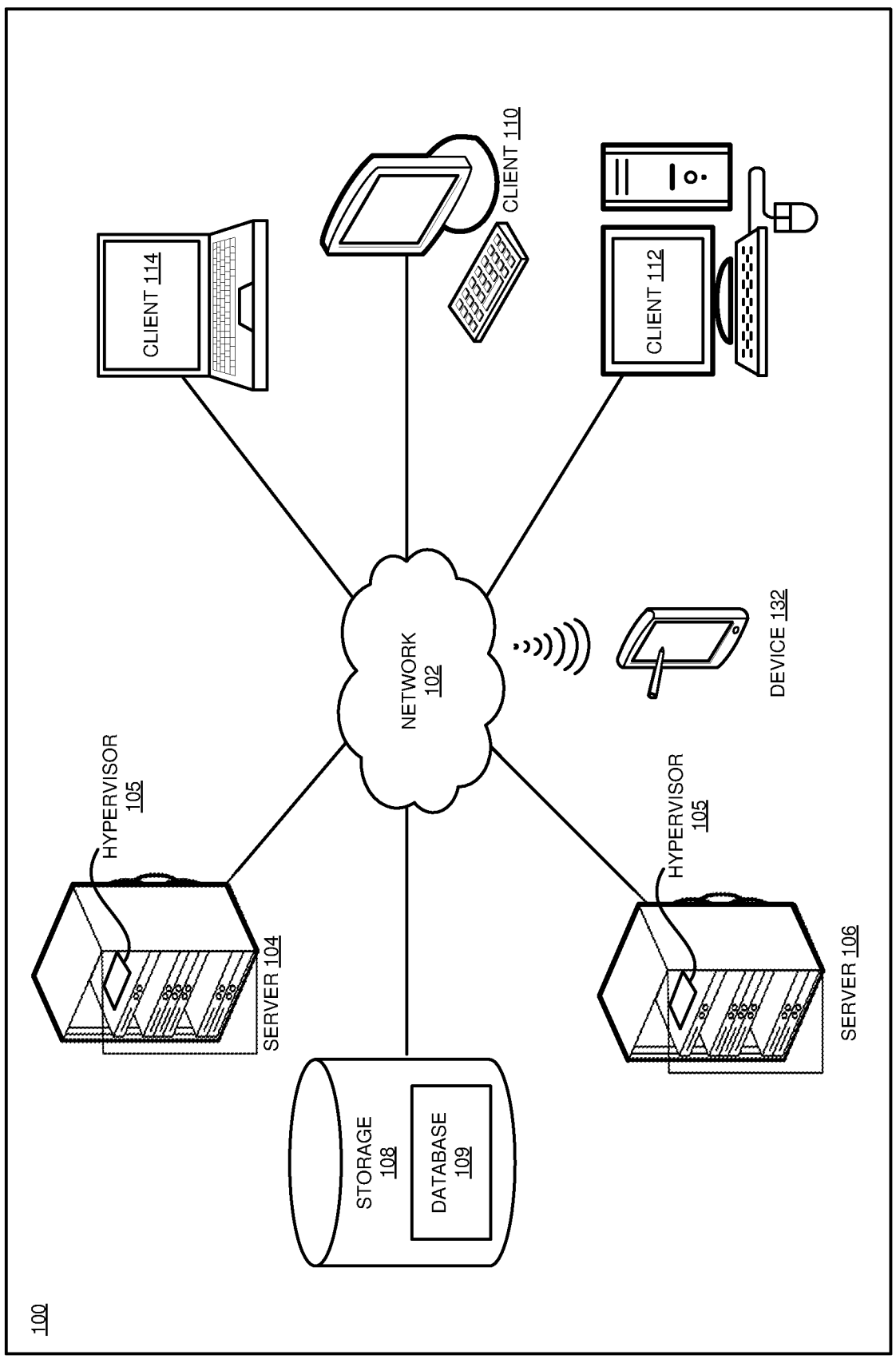
FIG. 1 depicts a block diagram of a network of data processing systems in which illustrative embodiments are implemented.

The illustrative embodiments recognize that there is a need for providing a user with solutions described herein that provide more efficient allocation, deployment and usage of memory and processor resources for exploitation by a given workload. Among other technical advantages and benefits, a user can be presented a user interface and only required to configure a single virtual PMEM device of the appropriate capacity for the given workload. The complexity of placement of the physical and virtual devices to optimize CPU socket affinity and the performance of the workload is rendered transparent to the user and is handled by a hypervisor application installed on a server device. The hypervisor application, among other benefits described herein, implements placement of the virtual PMEM devices in a manner that optimizes allocation of physical and virtual memory and processor resources across a data network in accordance with strong affinity based access proximity considerations. In embodiments, the hypervisor handles the complexity of optimizing placement of virtual PMEM devices by creating child virtual PMEM devices per the appropriate CPU sockets and informing a workload of their placement.

With further regard to existing solutions, a user interface for creating a virtual PMEM device would allow for the creation of a device with a given capacity without specifying which DRAM in the physical server will be used for backing the device. For workloads that require strong CPU affinity to achieve their performance goals, the amount of DRAM on each CPU socket available for virtual PMEM devices could be displayed and selected by the user. However, this exposes the user to additional complexity, requiring the user to understand guest placement, including which CPU sockets their IO adapters are attached to, and places the burden on the user to create the virtual PMEM devices on the correct CPU sockets.

Embodiments herein eliminate or minimize the problems of the latter solution and provide a mechanism for simplifying the user experience. Embodiments presented herein advantageously provide optimal virtual PMEM device affinity without exposing the user to additional complexity.

The term affinity as used herein refers to, and indicates, an access proximity of physical memory to physical central processor unit (CPU) cores for a particular virtual node. The virtual nodes in embodiments herein relates to a virtual CPU socket. In embodiments, the affinity characteristic as used herein is measurable as a ratio of the physical memory to the physical CPU cores that are assigned to a particular virtual CPU socket.

The illustrative embodiments recognize that the presently available tools or solutions do not address these needs or provide adequate solutions for these needs. The illustrative embodiments used to describe the invention generally address and solve the above-described problems and other problems related to of optimizing placement of virtual PMEM devices by creating child virtual PMEM devices per the appropriate CPU sockets and informing a workload of their placement.

An embodiment can be implemented as a hypervisor application constituted of any combination of hardware and software program instructions. The application implementing an embodiment can be configured as a modification of an existing server computing device or system, as a separate application that operates in conjunction with a server device, or some combination thereof.

. A method of an embodiment described herein, when implemented to execute on a device or data processing system, comprises substantial advancement of the functionality of that device or data processing system in optimizing placement of virtual PMEM devices. In embodiments, the placement of virtual PMEM devices is based on creating child virtual PMEM devices in accordance with generation of affinity based CPU sockets and informing a workload of their placement, thereby facilitating implementation of a virtualization solution that efficiently allocates virtual PMEM devices and related CPU resources for workloads where strong CPU affinity is critical for workload performance.

In embodiments herein, when configuring a virtual PMEM device for a guest, the user follows workload specific guidelines to create a single parent virtual PMEM device of a requested capacity. Each parent virtual PMEM device will be assigned a unique identifier (GUID). A mix of physical memory and virtual PMEM is apportioned based on a ratio of physical to virtual PMEM that the hypervisor assigns. CPU sockets are generated and assigned by the hypervisor taking into account affinity characteristics in relation to physical and virtual resources, both CPU and memory. Each virtual CPU socket is configured based on at least one physical central processor unit (CPU) core in conjunction with a subset of the virtual PMEM and physical memory resources. In an embodiment, the hypervisor applies an affinity optimization algorithm to determine optimally assignment of physical CPU cores and DRAM capacity to the guest based on the total DRAM requirements. In embodiments, the amount of DRAM available for virtual PMEM usage can be dynamically adjusted based on an amount of DRAM connected and assigned to each CPU socket, the amount of DRAM assigned to guest functions by the hypervisor managing a given CPU socket, and the amount of DRAM assigned to each CPU socket being used by the system firmware. Child virtual PMEMs are created in association with CPU sockets. Each of the child virtual PMEM devices is dedicated to the parent virtual PMEM device. During configuration of the workload within the guest, the hypervisor informs the workload of the physical and virtual resource placements in accordance with the CPU sockets and child virtual PMEMs. The GUID is applied to identify the virtual PMEM device provisioned for the workload.

In example embodiments, after determining the proper placement of the guest to maintain the best possible affinity characteristics, the hypervisor creates a child virtual PMEM device for a given parent virtual PMEM device for each of the created CPU sockets having DRAM and CPU cores assigned to the guest. The size of each child virtual PMEM device is based on the ratio of DRAM required for the parent virtual PMEM devices and the normal DRAM assignment. For example, if a guest with one parent virtual PMEM device is placed on three CPU sockets and receives 100 GB of DRAM on one socket, 150 GB each on the other two CPU sockets, and the ratio of DRAM for the virtual PMEM device to normal DRAM is 1:1, the guest receives 50 GB of normal DRAM and a 50 GB child virtual PMEM device on one CPU socket and 75 GB of normal DRAM and a 75 GB child virtual PMEM device on each of the other two CPU sockets The illustrative embodiments are described with respect to certain types of physical memory such as including, but not limited to DRAM, virtual memory including PMEM, hypervisor applications that are constituted of any combination of hardware and software program instructions, including hypervisor applications installed on server devices and systems, physical CPU cores, virtual CPU, server devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a hypervisor at a server device, any type of data storage device suitable for use with the server device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments.

Additional or different advantages may be realized by specific illustrative embodiments. Furthermore, a particular illustrative embodiment may have some, all, or none of the advantages listed above.

Figure 2:
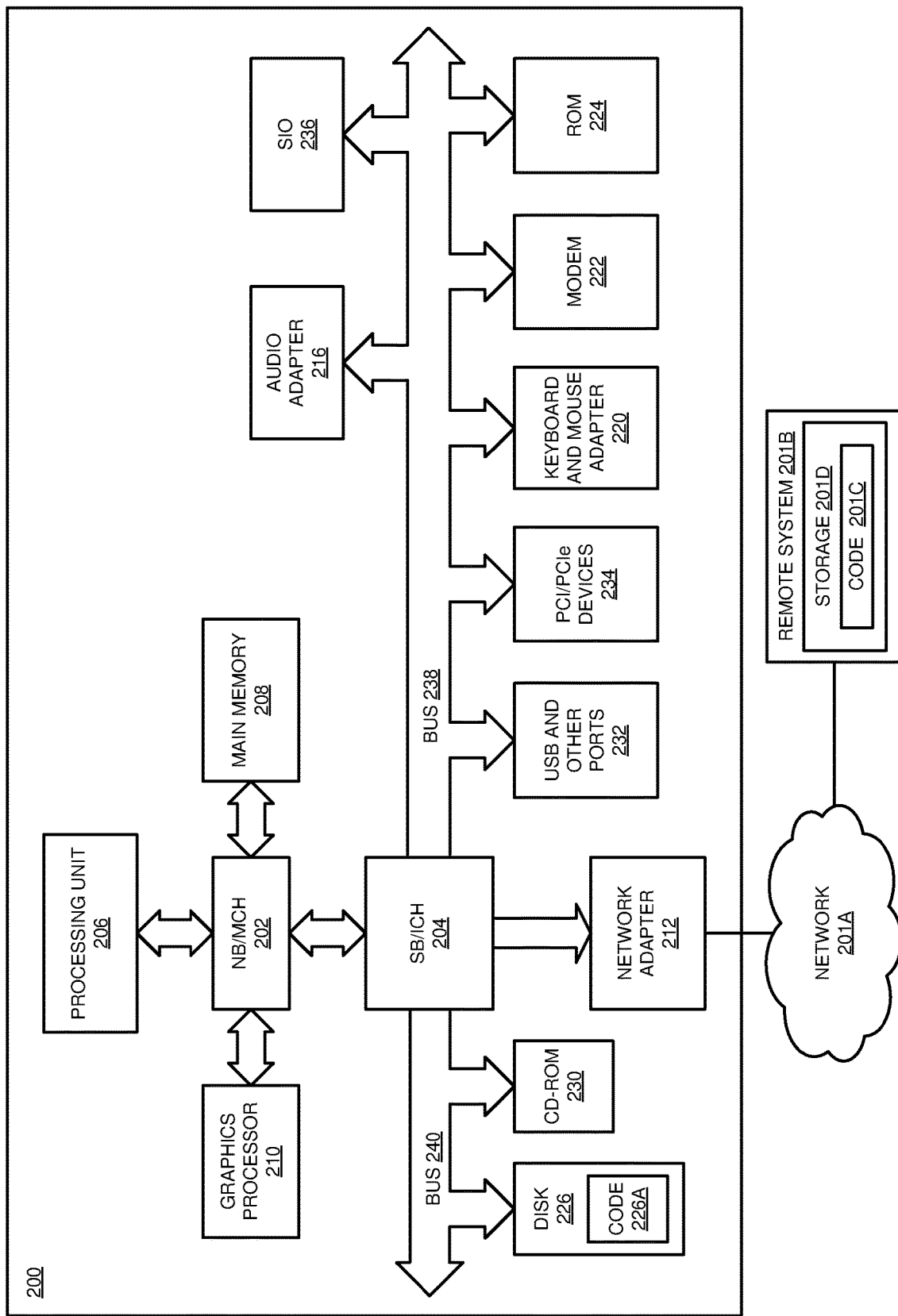
FIG. 2 depicts a block diagram of a data processing system in which illustrative embodiments are implemented.

With reference to the figures and in particular with reference to FIGS. 1 and 2, these figures are example diagrams of data processing environments in which illustrative embodiments are implemented. FIGS. 1 and 2 are only examples and are not intended to assert or imply any limitation with regard to the environments in which different embodiments are implemented. A particular implementation may make many modifications to the depicted environments based on the following description.

FIG. 1 depicts a block diagram of a network of data processing systems in which illustrative embodiments are implemented. Data processing environment 100 is a network of computers in which the illustrative embodiments are implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 112, 114 are also coupled to network 102. A data processing system, such as server 104 or 106, or clients 112, 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, and 114 also represent example nodes in a cluster, partitions, and other configurations suitable for implementing an embodiment.

Device 132 is an example of a mobile devices described herein. For example, device 132 can take the form of a smartphone, a tablet computer, a laptop computer, client 110 in a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Hypervisor 105 implements an embodiment described herein. Hypervisor can be comprised of any combination of hardware and software program instructions executable in one or more processors. Hypervisor 105 can execute in servers 104 and 106, storage unit 108, and clients 112, 114 coupled to network 102 using wired connections, wireless communication protocols, or other suitable data connectivity. Clients 112, 114 may be, for example, a portable personal computer.

In the depicted example, server 104 provides data, such as boot files, operating system images, and applications to clients 112, 114. Clients 112, 114 and devices 132, 134 may be clients to server 104 in this example. Clients 112, 114 as well as devices 132, 134 may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

FIG. 2 depicts a block diagram of a data processing system in which illustrative embodiments are implemented. Data processing system 200 is an example of a computer, such as servers 104 and 106, or another type of device in which computer usable program code or instructions implementing the processes may be located for the illustrative embodiments.

Data processing system 200 is also representative of a data processing system or a configuration therein, such as data processing system 100 in FIG. 1 in which computer usable program code or instructions implementing the processes of the illustrative embodiments may be located. Data processing system 200 is described as a computer only as an example, without being limited thereto. Implementations, in whole or only in part, in the form of other devices, such as devices 132, 134 in FIG. 1, may modify data processing system 200, such as by adding a display, touch interface, or an audio interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as hypervisor 105 in FIG. 1 and application 302 in FIG. 3A, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or smartphone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
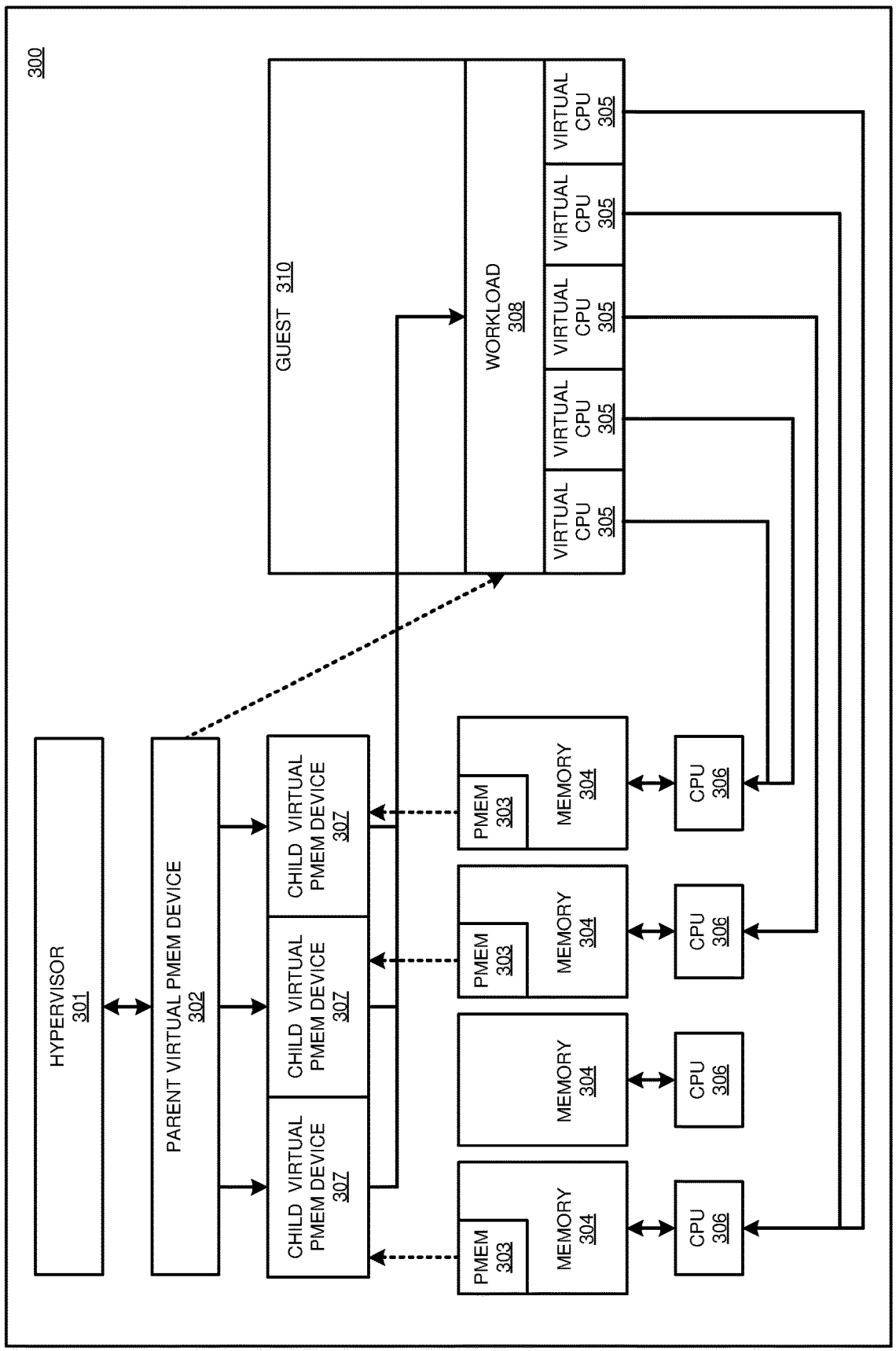
FIG. 3 depicts a block diagram of an example configuration for affinity based optimization of virtual persistent memory volumes.

FIG. 3 depicts a block diagram of an example configuration for affinity based optimization of virtual persistent memory volumes in accordance with an illustrative embodiment. In an embodiment in accordance with FIG. 3, hypervisor 301, corresponding to hypervisor 105 of the embodiment of FIG. 1, is installed on server 104, 106 and includes any combination of executable program instructions and hardware to implement functionality for affinity based optimization of virtual PMEM volumes. In some embodiments, hypervisor 301 comprises program instructions stored on one or more storage devices of server 104, 106 for execution by one or more processors.

With the availability of persistent memory (PMEM) technologies, software management and virtualization of such devices has introduced new challenges. With hardware based PMEM devices, the user typically sees a hardware PMEM device of a given capacity, and then assigns that device to a guest 310 as in FIG. 3. Alternatively, the user could partition the PMEM device into different PMEM volumes that are assigned to different guests or applications. For large multi socket systems where socket level affinity is important, the user will also take affinity into account when assigning IO and PMEM devices or volumes to guests and workloads to group CPU, IO, DRAM, and PMEM in close access proximity.

In addition to hardware based PMEM technologies, hypervisors can also support virtual PMEM devices backed by DRAM. Since these virtual devices are backed by DRAM, they do not have true persistency across power loss and server restarts. For highly reliable servers with advanced features that run years between server restarts, however, this provides customers the advantages of PMEM for most of their workload and application maintenance windows. Virtual PMEM devices also do not incur any of the performance penalties that hardware based PMEM devices incur over using traditional DRAM.

While virtual PMEM devices have some advantages, they also introduce new management complexity for the user. Unlike a hardware PMEM device that has a fixed capacity and is physically attached to a given CPU socket, the amount of DRAM under a socket that can be used for a virtual PMEM device will vary greatly depending on the system configuration. The amount of DRAM available for virtual PMEM usage can be affected by the amount of DRAM connected to each socket, the amount of DRAM assigned to guests by the hypervisor on each socket, and the amount of DRAM on each socket being used by the system firmware. Users typically have no knowledge of which CPU sockets will be used for guest placement during configuration. This makes it difficult for the user and the implementation of a virtualization solution to properly allocate virtual PMEM devices for workloads where strong CPU affinity is critical for workload performance.

In existing solutions, a user interface for creating a virtual PMEM device would allow for the creation of a device with a given capacity without specifying which DRAM in the physical server will be used for backing the device. For workloads that require strong CPU affinity to achieve their performance goals, the amount of DRAM on each CPU socket available for virtual PMEM devices could be displayed and selected by the user. However, this exposes the user to additional complexity, requiring the user to understand guest placement, including which CPU sockets their IO adapters are attached to, and places the burden on the user to create the virtual PMEM devices on the correct CPU sockets.

Embodiments herein eliminate the problems of the latter solution and provide a mechanism for simplifying the user experience. Embodiments presented herein advantageously provide optimal virtual PMEM device affinity without exposing the user to additional complexity.

Embodiment solutions described herein shield a user from the complexity of manually optimizing placement of the virtual PMEM devices. A user can be presented a simple user interface and only required to configure a single virtual PMEM device of the appropriate capacity for a given workload. The complexity of placement of the devices to optimize CPU socket affinity and the performance of the workload is handled by the hypervisor 301 and is transparent to the user. The hypervisor 301 handles the complexity of optimizing placement by creating child virtual PMEM devices per the appropriate CPU sockets and informing a workload of their placement.

In particular embodiments depicted in FIG. 3, hypervisor 301 apportions, responsive to receiving a request for a parent virtual PMEM device 302, a total memory capacity amongst persistent memory (PMEM) resources 303 and physical memory resources 304. Hypervisor 301 assigns, in accordance with a target affinity value, a set of virtual central processor unit (CPU) sockets 305, each virtual CPU socket being configured based on a physical central processor unit (CPU) core 306 in conjunction with a subset of the PMEM 303 and dynamic memory 304 resources. Hypervisor 301 creates a set of child virtual PMEM devices 307 for respective ones of the set of virtual CPU sockets 306, each child virtual PMEM device of the set of child virtual PMEM devices being dedicated to the parent virtual PMEM device 302.

Figure 4:
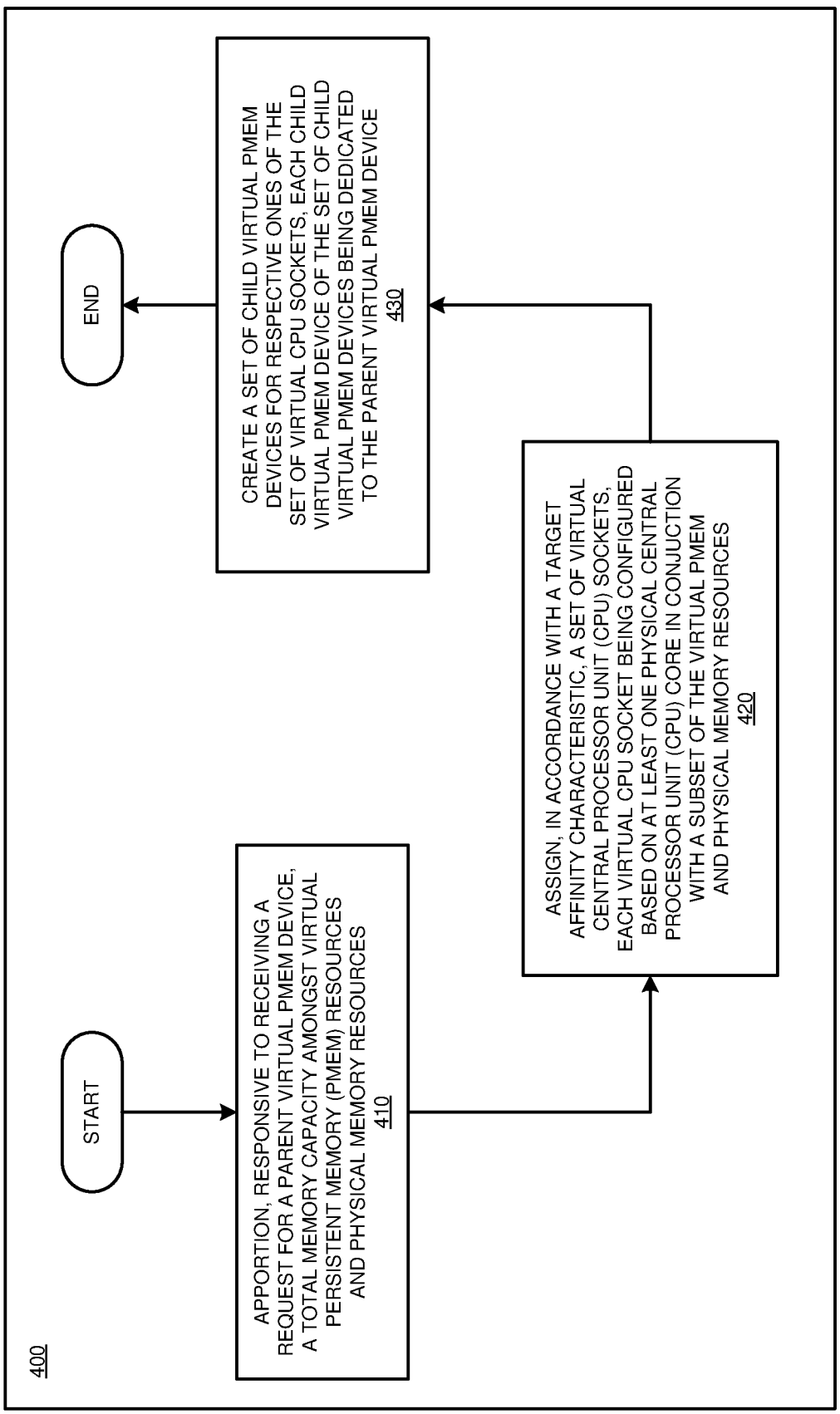
FIG. 4 depicts a flowchart of an example process for affinity based optimization of virtual persistent memory volumes.

FIG. 4 depicts a flowchart of an example process for affinity based optimization of virtual persistent memory volumes in accordance with an illustrative embodiment.

At block 410, hypervisor 301 apportions, responsive to receiving a request for a parent virtual PMEM device, a total memory capacity amongst virtual persistent memory (PMEM) resources and physical memory resources. In embodiments, the apportioning comprises a ratio of the virtual persistent memory (PMEM) to the physical memory resources. In embodiments, when configuring a virtual PMEM device for a guest 310, the user follows workload specific guidelines to create a single parent virtual PMEM device of the appropriate capacity. Each parent virtual PMEM device will be assigned a unique identifier (GUID). The GUID will be used by the user during configuration of a workload within the guest to identify the virtual PMEM device provisioned for the workload.

At block 420, hypervisor 301 assigns, in accordance with a target affinity characteristic, a set of virtual central processor unit (CPU) sockets. Each virtual CPU socket is configured based on at least one physical central processor unit (CPU) core in conjunction with a subset of the virtual PMEM and physical memory resources. In some embodiments, the affinity characteristic indicates an access proximity of physical memory to physical CPU cores for a particular virtual CPU socket of the set of virtual CPU sockets. In related embodiments, the affinity characteristic is measurable as a ratio of the physical memory to the physical CPU cores that are assigned to the particular virtual CPU socket.

During deployment of a guest, the hypervisor will determine the total DRAM requirement for both regular DRAM (or physical DRAM as referred to herein) and virtual PMEM device assignments for the guest. The hypervisor will also determine the ratio of DRAM required for virtual PMEM devices and the physical DRAM assignment. An affinity optimization algorithm will determine how to optimally assign physical CPU core and DRAM capacity to the guest based on the total DRAM requirements.

At block 430, hypervisor 301 creates a set of child virtual PMEM devices for respective ones of the set of virtual CPU sockets. Each child virtual PMEM device of the set of child virtual PMEM devices is dedicated to the parent virtual PMEM device. After determining the proper placement of the guest to maintain the best possible affinity characteristics, the hypervisor will create a child virtual PMEM device for each parent virtual PMEM device for each CPU socket with DRAM and CPU cores assigned to the guest. The size of each child virtual PMEM device will be based on the ratio of DRAM required for the parent virtual PMEM devices and the physical DRAM assignment. For example, if a guest with one parent virtual PMEM device is placed on three CPU sockets and receives 100 GB of DRAM on one socket, 150 GB each on the other two CPU sockets, and the ratio of DRAM for the virtual PMEM device to physical DRAM is 1:1, the guest would receive 50 GB of physical DRAM and a 50 GB child virtual PMEM device on one CPU socket and 75 GB of physical DRAM and a 75 GB child virtual PMEM device on each of the other two CPU sockets.

Figure 5:
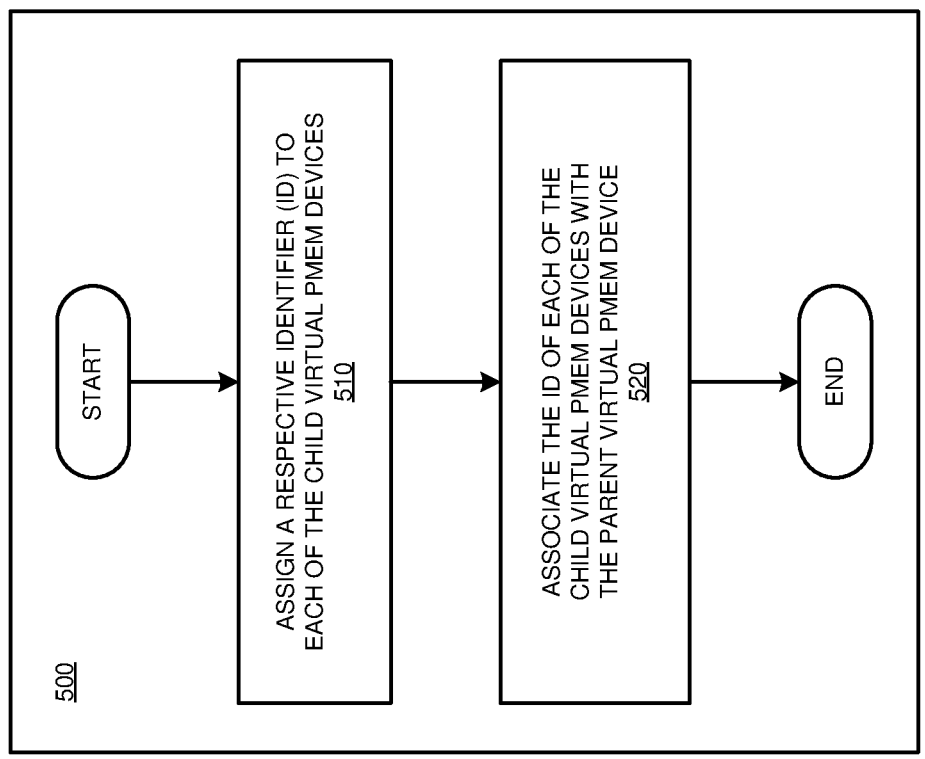
FIG. 5 depicts a flowchart of an example process for affinity based optimization of virtual persistent memory volumes.

FIG. 5 depicts a flowchart of an example process for affinity based optimization of virtual persistent memory volumes. Process 500 can be implemented using hypervisor 301 in FIG. 3, in conjunction with process 400 as depicted in FIG. 400.

In block 510, the hypervisor 301 assigns a respective identifier (ID) to each of the child virtual PMEM devices. Each of the child virtual PMEM devices will be assigned a child GUID. The child GUID will be presented to the operating system and used for unique identification of the child virtual PMEM devices for determination of the contained data, proper filesystem mount point, etc.

In block 520, hypervisor 301 associates the ID of each of the child virtual PMEM devices with the parent virtual PMEM device. Each child virtual PMEM device presented to the operating system will also contain the parent GUID for the associated parent virtual PMEM device.

Figure 6:
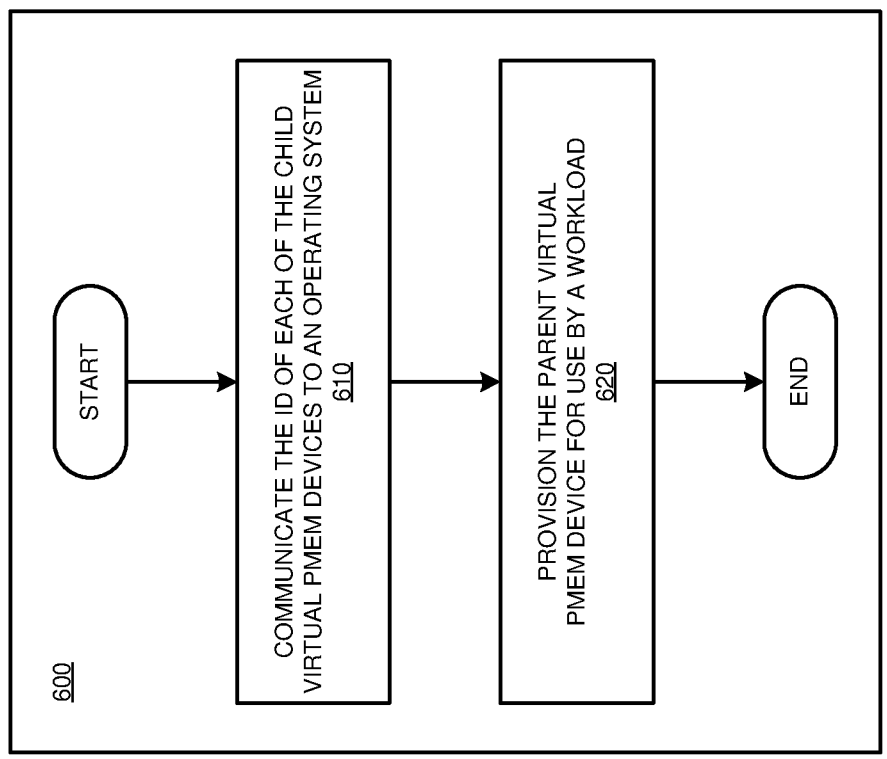
FIG. 6 depicts a flowchart of a further example process for affinity based optimization of virtual persistent memory volumes.

FIG. 6 depicts a flowchart of an example process for affinity based optimization of virtual persistent memory volumes in accordance with another illustrative embodiment. Process 600 can be implemented in hypervisor 301 in FIG. 3, in conjunction with process 400 as depicted in FIG. 4.

In block 610, hypervisor 301 communicates the ID of each of the child virtual PMEM devices to an operating system. Each of the child virtual PMEM devices will be assigned a child GUID. The child GUID will be presented to the operating system and used for unique identification of the child virtual PMEM devices for determination of the contained data, proper filesystem mount point, etc. Each child virtual PMEM device presented to the operating system will also contain the parent GUID for the associated parent virtual PMEM device.

In block 620, hypervisor 301 provisions the parent virtual PMEM device for use by a workload. When the workload is started, it will examine the devices presented to the operating system to identify the set of child virtual PMEM devices containing the parent GUID of the parent virtual PMEM device provisioned for the workload by the user. The workload will then initialize each of the discovered devices properly based on how it intends to exploit persistent memory.

Many workloads exploit persistent memory by creating a filesystem over the range of PMEM that a physical device represents. Current filesystem designs and APIs may not have support for CPU affinity placement. Since physical PMEM devices are connected to a specific CPU, creating a filesystem over the device works well for workloads that require strong CPU affinity to achieve their performance goals. This allows the workloads to observe a filesystem per CPU affinity domain and make affinity decisions based on the various filesystem mount points.

Figure 7:
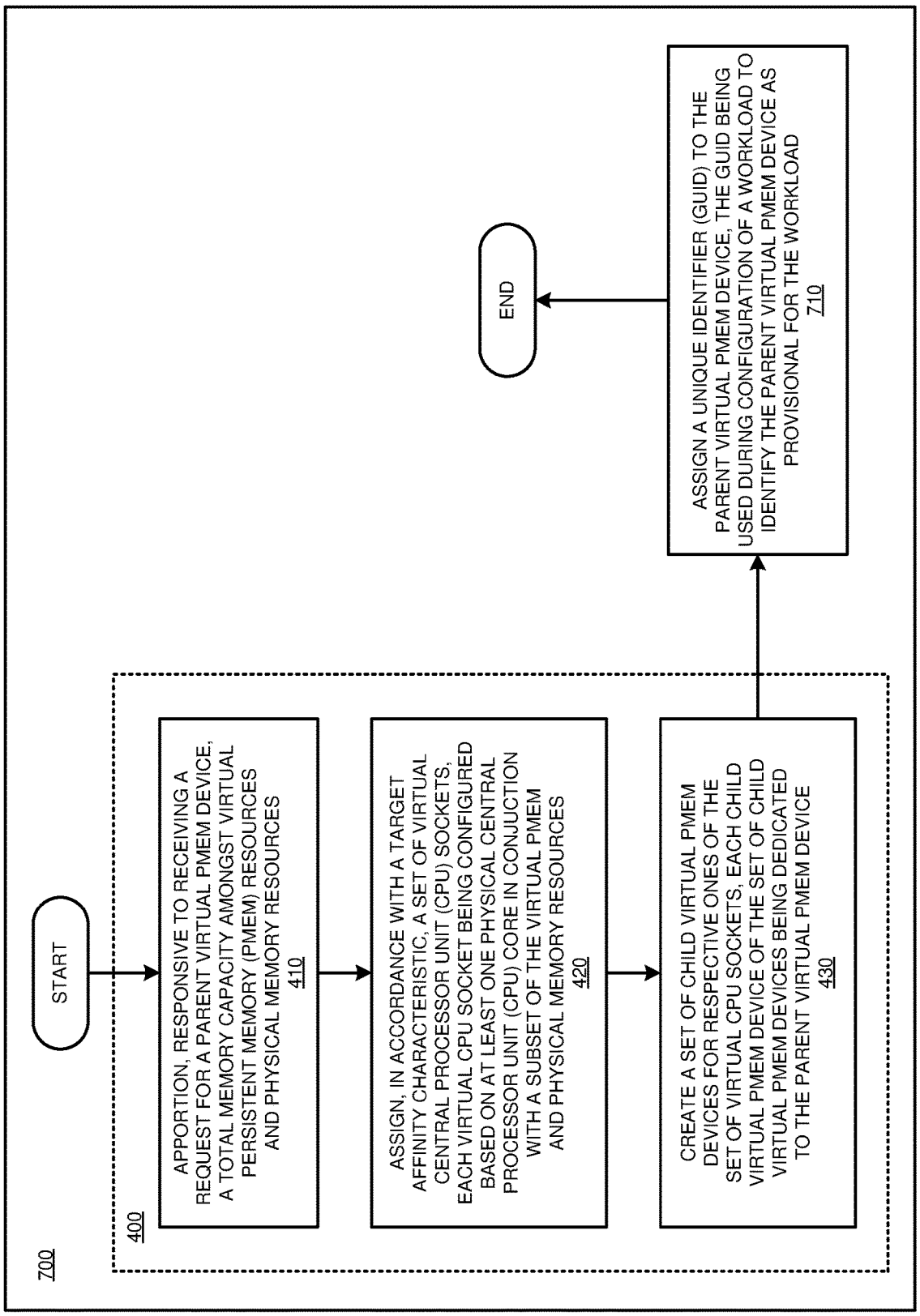
FIG. 7 depicts a flowchart of another example process for affinity based optimization of virtual persistent memory volumes.

The workload may create a filesystem on each child device and mount it at a location in the overall filesystem that indicates its association with a set of CPU cores. The workload may instead record in its own data structures the address space of the devices and their associated CPU sockets FIG. 7 depicts a flowchart of an example process for affinity based optimization of virtual persistent memory volumes in accordance with an additional illustrative embodiment. Process 700 can be implemented in hypervisor 301 of FIG. 3, in conjunction with process 400 as depicted in FIG. 4.

In block 710, hypervisor 301 assigns a unique identifier (GUID) to the parent virtual PMEM device. The GUID is used during configuration of a workload to identify the parent virtual PMEM device as provisioned for the workload. Each of the child virtual PMEM devices are assigned a child GUID. The child GUID will be presented to the operating system and used for unique identification of the child virtual PMEM devices for determination of the contained data, proper filesystem mount point, etc. Each child virtual PMEM device presented to the operating system will also contain the parent GUID for the associated parent virtual PMEM device.

Thus, a computer implemented method, system or apparatus, and computer program product are provided in the illustrative embodiments for affinity based optimization of virtual PMEM placements and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   apportioning, responsive to receiving a request for a parent virtual persistent memory (PMEM) device, a total memory capacity of non-persistent physical memory into a plurality of portions;
   assigning, in accordance with a target affinity characteristic, a set of virtual central processor unit (CPU) sockets, each virtual CPU socket being configured based on at least one physical CPU core in conjunction with a subset of the non-persistent physical memory; and
   allocating each of the plurality of portions of the non-persistent physical memory as respective child virtual PMEM devices for respective ones of the set of virtual CPU sockets, each child virtual PMEM device being dedicated to the parent virtual PMEM device.

2. The computer-implemented method of claim 1, further comprising:
   assigning a respective identifier (ID) to each of the child virtual PMEM devices; and
   associating the ID of each of the child virtual PMEM devices with the parent virtual PMEM device.

3. The computer-implemented method of claim 2, further comprising:
   communicating the ID of each of the child virtual PMEM devices to an operating system; and
   provisioning the parent virtual PMEM device for use by a workload.

4. The computer-implemented method of claim 3, wherein the workload initializes the set of child virtual PMEM devices based on the ID of each of the child virtual PMEM devices.

5. The computer-implemented method of claim 1, further comprising assigning a unique identifier (GUID) to the parent virtual PMEM device, the GUID being used during configuration of a workload to identify the parent virtual PMEM device as provisioned for the workload.

6. The computer-implemented method of claim 5, wherein the workload creates a filesystem on each child virtual PMEM device and configures the filesystem at a location in a master filesystem that indicates an association with a set of physical CPU cores.

7. The computer-implemented method of claim 5, wherein the workload creates a filesystem on each child virtual PMEM device and records, in a set of data structures, respective addresses of the parent and child virtual PMEM devices in association with the set of virtual CPU sockets.

8. The computer-implemented method of claim 5, wherein the non-persistent physical memory comprises an amount of dynamic random access memory (DRAM), and
wherein the allocating comprises assigning a first portion of the amount of DRAM as one of the child virtual PMEM devices and assigning a second portion of the amount of DRAM as normal DRAM.

9. The computer-implemented method of claim 1, wherein the target affinity characteristic indicates an access proximity of non-persistent physical memory to physical CPU cores for a particular virtual CPU socket of the set of virtual CPU sockets, the target affinity characteristic being measurable as a ratio of the non-persistent physical memory to the physical CPU cores that are assigned to the particular virtual CPU socket.

10. The computer-implemented method of claim 1, wherein the apportioning of the total memory capacity, the assigning of the set of virtual CPU sockets, and the allocating of the portions of the non-persistent physical memory are performed in a hypervisor installed on a server computing device.

11. A computer usable program product comprising one or more computer-readable storage devices, and program instructions stored on at least one of the one or more storage devices, the stored program instructions comprising:
program instructions to apportion, responsive to receiving a request for a parent virtual persistent memory (PMEM) device, a total memory capacity of non-persistent physical memory into a plurality of portions;
program instructions to assign, in accordance with a target affinity characteristic, a virtual central processor unit (CPU) socket, the virtual CPU socket being configured based on a physical CPU core in conjunction with a first portion from the plurality of portions of the non-persistent physical memory; and
program instructions to allocate the first portion as a child virtual PMEM device corresponding to the virtual CPU socket.

12. The computer usable program product of claim 11, further comprising program instructions to:
assign an identifier (ID) to the child virtual PMEM device; and
associate the ID of the child virtual PMEM device with the parent virtual PMEM device.

13. The computer usable program product of claim 12, further comprising program instructions to:
communicate the ID of the child virtual PMEM device to an operating system; and
provision the parent virtual PMEM device for use by a workload.

14. The computer usable program product of claim 13, wherein the workload initializes the child virtual PMEM device based on the ID of the child virtual PMEM device.

15. The computer usable program product of claim 11, further comprising program instructions to assign a unique identifier (GUID) to the parent virtual PMEM device, the GUID being used during configuration of a workload to identify the parent virtual PMEM device as provisioned for the workload.

16. The computer usable program product of claim 15, wherein the workload creates a filesystem on the child virtual PMEM device and configures the filesystem at a location in a master filesystem that indicates an association with a set of physical CPU cores.

17. The computer usable program product of claim 15, wherein the workload creates a filesystem on the child virtual PMEM device and records, in a set of data structures, respective addresses of the parent and child virtual PMEM devices in association with the virtual CPU socket corresponding to the child virtual PMEM.

18. The computer usable program product of claim 15, wherein the non-persistent physical memory comprises an amount of dynamic random access memory (DRAM), and
wherein the allocating comprises assigning a first portion of the amount of DRAM as one of the child virtual PMEM devices and assigning a second portion of the amount of DRAM as normal DRAM.

19. The computer usable program product of claim 11, wherein the target affinity characteristic indicates an access proximity of non-persistent physical memory to physical CPU units for a particular virtual CPU socket in a set of virtual CPU sockets, the target affinity characteristic being measurable as a ratio of the non-persistent physical memory to the physical CPU units that are assigned to the particular virtual CPU socket.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to apportion, responsive to receiving a request for a parent virtual persistent memory (PMEM) device, a total memory capacity of non-persistent physical memory into a plurality of portions;
program instructions to assign, in accordance with a target affinity value, a set of virtual central processor unit (CPU) sockets, each virtual CPU socket being configured based on a physical CPU core in conjunction with a subset of the non-persistent physical memory; and
program instructions to allocate each of the plurality of portions of the non-persistent physical memory as respective child virtual PMEM devices for respective ones of the set of virtual CPU sockets, each child virtual PMEM device being dedicated to the parent virtual PMEM device.

* * * * *